United States Patent
Najafi

(10) Patent No.: US 6,853,840 B2
(45) Date of Patent: Feb. 8, 2005

(54) SYSTEM AND METHOD FOR ENABLING AND DISABLING DEVICES BASED ON RSSI ANALYSIS

(75) Inventor: Hamid Najafi, Los Altos Hills, CA (US)

(73) Assignee: CSI Wireless LLC, Milpitas, CA (US)

( * ) Notice: Subject to any disclaimer, the term of this patent is extended or adjusted under 35 U.S.C. 154(b) by 628 days.

(21) Appl. No.: 09/798,272

(22) Filed: Mar. 2, 2001

(65) Prior Publication Data

US 2002/0127967 A1 Sep. 12, 2002

(51) Int. Cl.[7] .................................................. H04B 1/00
(52) U.S. Cl. ...................... 455/410; 455/426.2; 455/69; 455/574
(58) Field of Search ............................... 455/426.2, 410, 455/3.06, 421, 74.1, 69, 456.1, 456.4, 574; 340/7.32, 7.36; 379/33, 35, 36, 37, 39

(56) References Cited

U.S. PATENT DOCUMENTS

| | | | |
|---|---|---|---|
| 5,444,862 A | * 8/1995 | Hibino | 455/504 |
| 5,754,962 A | 5/1998 | Griffin | 455/569 |
| 5,905,950 A | * 5/1999 | Anell | 455/421 |
| 5,940,742 A | 8/1999 | Dent | 455/31.3 |
| 6,006,077 A | 12/1999 | Shull | 455/226.2 |
| 6,006,096 A | 12/1999 | Trompower | 455/456 |
| 6,026,288 A | 2/2000 | Bronner | 455/343 |
| 6,067,460 A | 5/2000 | Alanara et al. | 455/574 |
| 6,073,010 A | * 6/2000 | Dufour | 455/432.3 |
| 6,078,826 A | 6/2000 | Croft et al. | 455/574 |
| 6,104,978 A | * 8/2000 | Harrison et al. | 701/207 |
| 6,141,570 A | * 10/2000 | O'Neill et al. | 455/574 |
| 6,154,665 A | 11/2000 | Briffett et al. | 455/574 |
| 6,167,275 A | 12/2000 | Oros et al. | 455/456 |
| 6,292,660 B1 | * 9/2001 | Hartless et al. | 455/434 |
| 6,385,460 B1 | * 5/2002 | Wan | 455/515 |
| 6,434,390 B2 | * 8/2002 | Rahman | 455/440 |

OTHER PUBLICATIONS

"Voice and Data Transmission" The Bell System Technical Journal, Jan. 1979, pp 98–103.

* cited by examiner

Primary Examiner—Nick Corsaro
(74) Attorney, Agent, or Firm—Squire, Sanders & Dempsey, L.L.P.; Aaron Wininger

(57) ABSTRACT

The system comprises a wireless transceiver with a processor for measuring RSSI in received signals. The processor analyzes fade duration or fade frequency in the received signals to determine if the transceiver is moving. If the transceiver is moving, then the processor can send a command to disable a fixed wireless terminal in one embodiment. In another embodiment, if the transceiver is not moving, then the processor can send a command to place a GPS receiver into a power conservation mode.

5 Claims, 5 Drawing Sheets

SYSTEM AND METHOD FOR ENABLING AND DISABLING DEVICES BASED ON RSSI ANALYSIS

BACKGROUND OF THE INVENTION

1. Field of the Invention

This invention relates generally to radio transceivers, and more particularly provides a system and method for enabling and disabling devices based on movement of the devices as determined by measurements of a received signal strength indicator ("RSSI") within a transceiver.

2. Description of the Background Art

In various geographical regions lacking sufficient telecommunications infrastructure, it is generally more efficient to install and use wireless phones than to install fixed lines to individual homes and businesses. Under these circumstances, service providers oftentimes charge lower rates for wireless phones installed as fixed wireless terminals ("FWT") than for wireless phones used as mobile phones. Accordingly, there is a need to verify that a FWT is not being used as a mobile phone, and, if so, disable the FWT.

This need may be satisfied via installing a global positioning system ("GPS") receiver into the wireless phone. The GPS receiver can monitor movement of the wireless phone. However, most wireless phones do not have GPS receivers. Further, GPS receivers can be expensive and may add unwanted weight, bulk, and complexity to the wireless phone. Further, GPS receivers use additional electrical power, which may be limited in certain geographical locations.

Similarly, in asset-tracking applications, such as tracking freight trailers, a GPS receiver is typically used to track the asset. However, GPS receivers tend to draw a lot of power, which can be a problem as asset-tracking systems may use a battery, which has a finite supply of power. Accordingly, it would be ideal to turn off the GPS receiver or place the GPS receiver in a power conservation mode when the asset is not moving and then turn the GPS receiver back on or wake it from the power conservation mode when the asset begins to move in order to conserve battery power.

Accordingly, a system and method for disabling and enabling devices as a function of movement, without the use of GPS, is highly desirable.

SUMMARY

The present invention provides a system for disabling and enabling devices based on movement as determined by RSSI measurements. The system comprises a wireless transceiver with a processor for measuring RSSI. RSSI signals typically vary as a function of time in a Rayleigh fading pattern. The system measures fade rate and/or fade duration of the RSSI to calculate movement of the wireless transceiver. If there is movement, the system disables the wireless phone in the fixed wireless terminal embodiment. Once movement stops, the system can re-enable the wireless phone.

In an asset-tracking embodiment, if no movement has been detected, the system powers off the GPS receiver. Alternatively, the system may place the GPS receiver into a power-conservation mode if there is no movement. If the system detects movement, the system can then power on the GPS receiver or wake it from power-conservation mode.

The present invention further provides a method for disabling or enabling devices based on movement of a wireless transceiver as determined by RSSI measurements. The method comprises the steps of receiving an RSSI sample from the RSSI circuit; averaging the RSSI sample, and then determining if the RSSI sample indicates movement based on fade frequency and/or fade duration. If there is movement, then in the fixed wireless terminal embodiment, the wireless phone is disabled. In the asset-tracking embodiment, if there is no movement, a GPS receiver is placed in a power conservation mode or turned off. Once movement is detected, the GPS receiver is turned on or wakes from power conservation mode.

Therefore, the system and method may advantageously disable and enable devices based on movement as measured by a RSSI.

DETAILED DESCRIPTION OF THE PREFERRED EMBODIMENT

The following description is provided to enable any person skilled in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
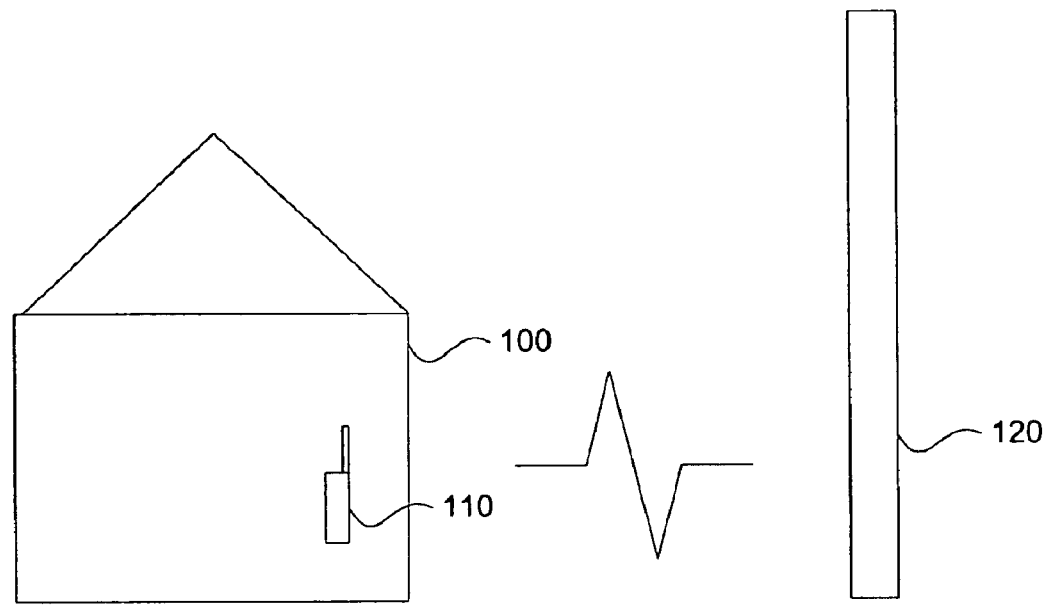
FIG. 1 is a block diagram illustrating a FWT environment according to a first embodiment of the present invention.

FIG. 1 is a block diagram illustrating a FWT environment according to a first embodiment of the present invention. The environment includes FWT 110 located in house 100 and base station 120. FWT 110 and base station 120 communicate to each other via wireless signals using Frequency Division Multiple Access (FDMA), Time Division Multiple Access (TDMA), Code Division Multiple Access (CDMA), or any other wireless technology.

Figure 2:
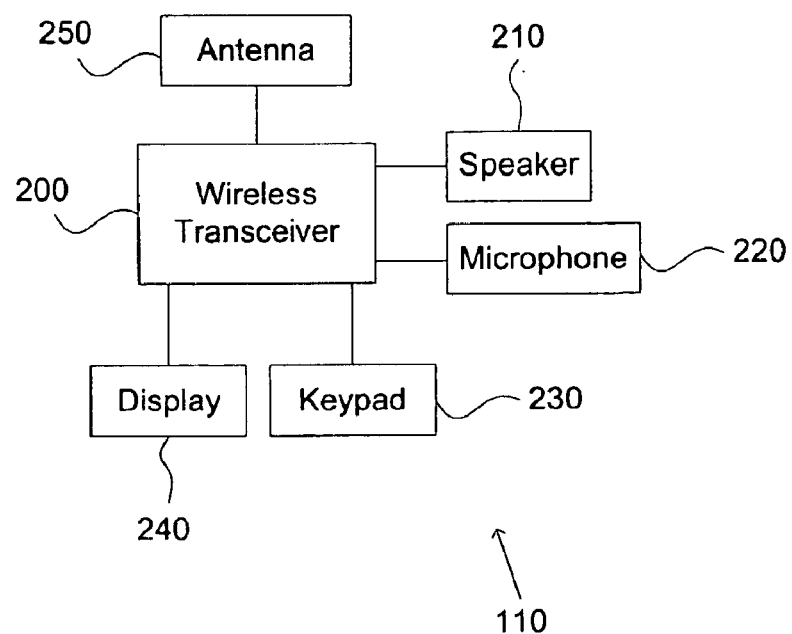
FIG. 2 is a block diagram of the FWT of FIG. 1.

FIG. 2 is a block diagram of the FWT 110 of FIG. 1. FWT 110 comprises a wireless transceiver 200; speaker 210; microphone 220; keypad 230; display 240; and antenna 250. Wireless transceiver 200, as will be discussed further in conjunction with FIG. 3, receives and processes wireless signals via antenna 250 and transmits wireless signals via antenna 250. Wireless transceiver 200 outputs processed signals via speaker 210 and accepts sound for transmission from microphone 220. Keypad 230 is used to enter a telephone number for calling. Display 240, like some other elements of FWT 110, is optional and displays the telephone number called as well as other information.

Figure 3:
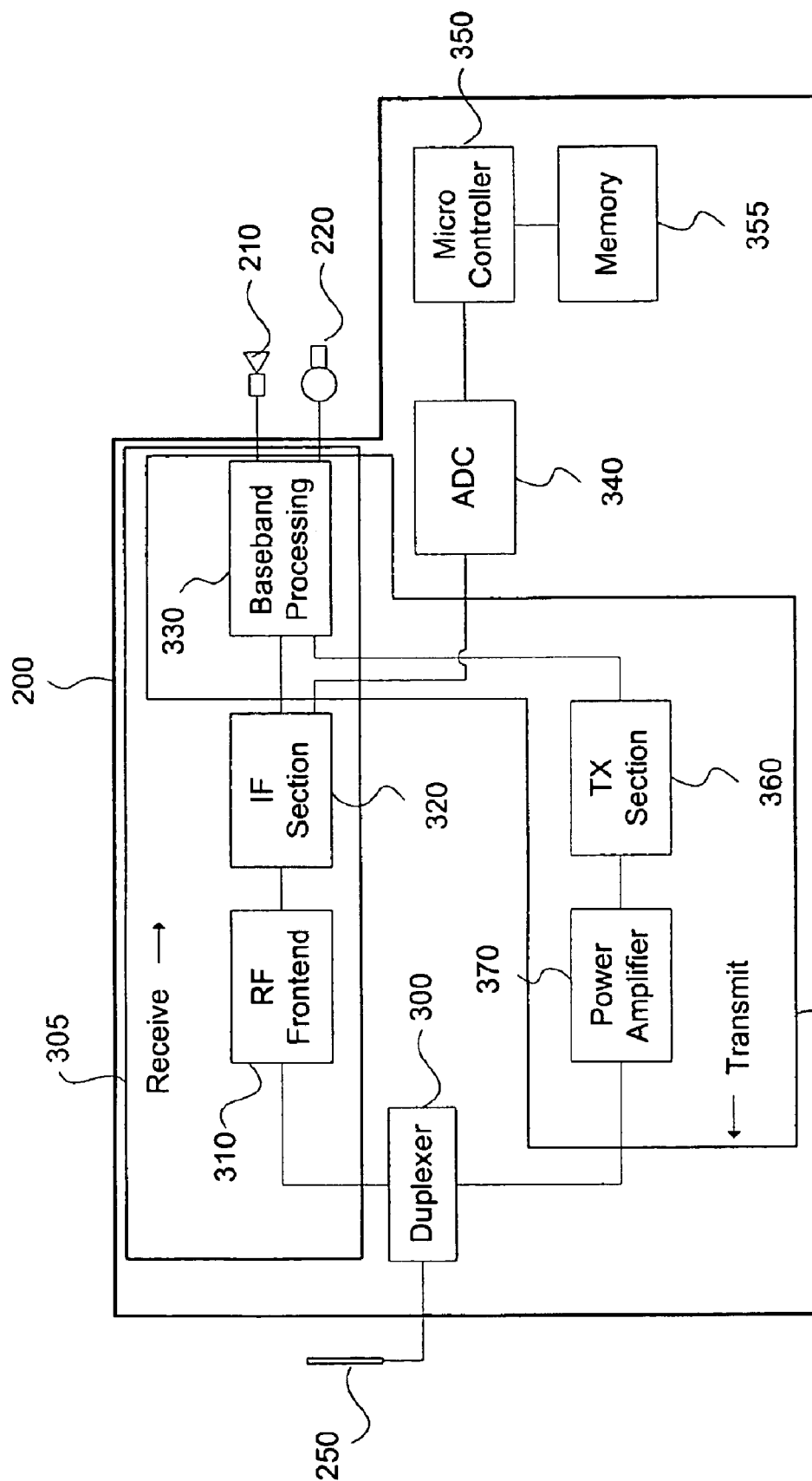
FIG. 3 is a block diagram of the wireless transceiver of FIG. 2.

FIG. 3 is a block diagram of the wireless transceiver 200 of FIG. 2. The wireless transceiver 200 receiver section 305 uses a superheterodyne receiver architecture comprising a radio frequency ("RF") frontend 310, intermediate frequency ("IF") section 320, and a baseband processing section 330. Alternatively, the receiver section can use other architectures for receiving and processing signals. Duplexer 300 allows transceiver 200 to perform two-way simultaneous communication, i.e., to transmit and receive wireless signals. Radio frequency ("RF") frontend 310 converts the wireless signal received at antenna 250 to an IF signal using a local oscillator and mixer. IF section 320 amplifies the IF signal. Baseband processing section 330 then extracts voice data and amplifies the voice data for output to speaker 210.

The wireless transceiver 200 transmitter section 365 uses a direct FM modulation technique, which includes the baseband processing section 330; a TX section 360 and a power amplifier 370. Alternatively, the transmitter section may employ an in-phase and quadrature phase ("IQ") processing technique or any other technique for processing and transmitting signals. The baseband processing section 330 processes the signal received from microphone 220. TX section 360 then uses a carrier oscillator and phase modulator to encode the signal in a carrier wave. Power amplifier 370 then amplifies the carrier wave for output at antenna 250 via duplexer 300.

Elements in transceiver 200 that are not part of the transmitter section 365 or receiver section 305 include analog to digital converter ("ADC") 340, micro controller 350 and memory 355, which can be RAM, ROM, or other memory device or a combination thereof. ADC 340 is coupled to IF section 320 and converts the IF signal to digital data for processing by micro controller 350. Micro controller 350 executes instructions in memory 350 for analyzing RSSI in the digitized IF signal and disabling FWT 110 when appropriate. Execution of the instructions in memory 350 will be discussed in further detail in conjunction with FIG. 4 and FIG. 5 below.

Figure 4:
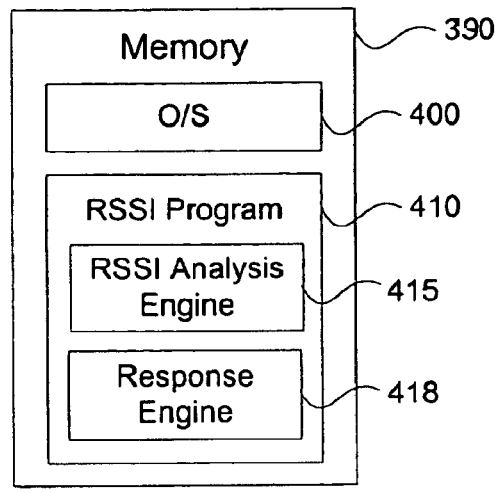
FIG. 4 is a block diagram of the contents of memory in the wireless transceiver of FIG. 3.

FIG. 4 is a block diagram of the contents of memory 355 in the wireless transceiver 200 of FIG. 3. Memory 355 comprises an operating system ("O/S") and an RSSI program 410, which includes a RSSI analysis engine 415 and a response engine 418. The analysis engine 415 receives and analyzes an RSSI in the digital data to determine if the transceiver 200 is moving. If the transceiver is moving, then response engine 418 disables the FWT 110.

Figure 5:
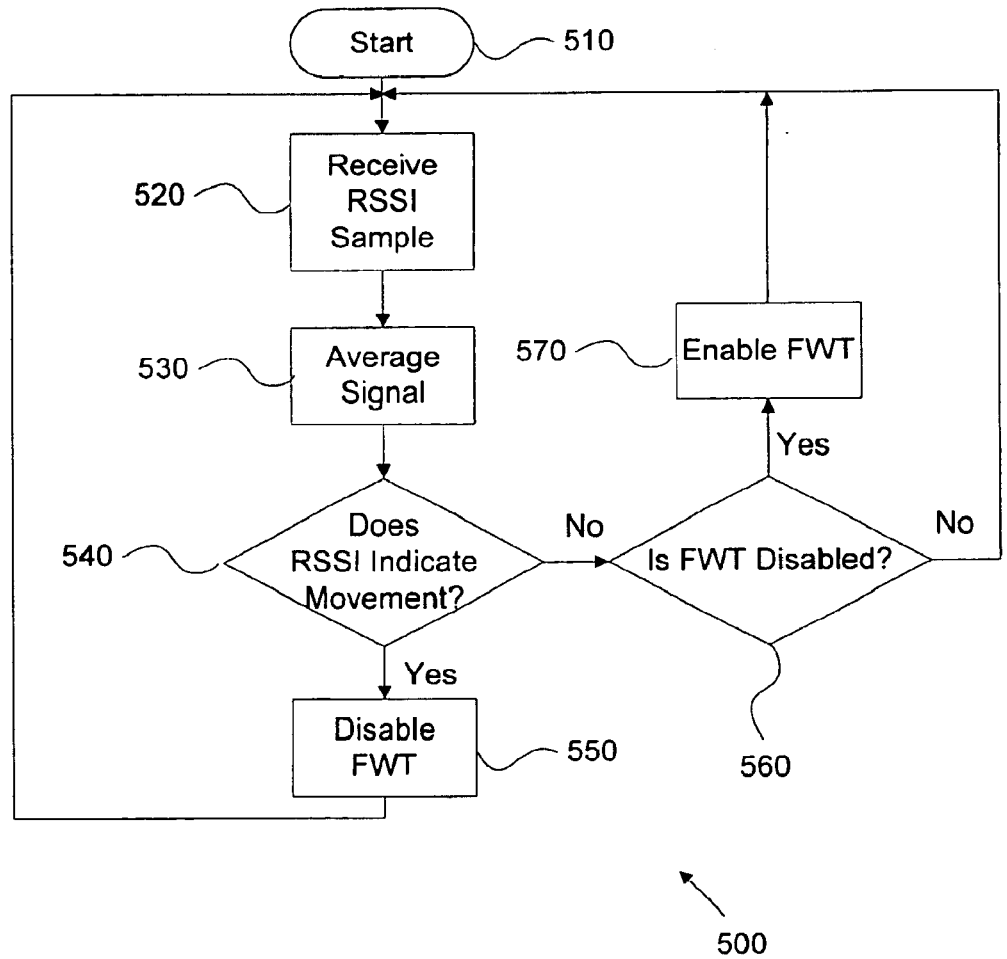
FIG. 5 is a flowchart of method steps performed by a RSSI program in the memory of FIG. 4.

FIG. 5 is a flowchart 500 of method steps performed by RSSI program 410 in the memory 355 of FIG. 4. At step 520, analysis engine 415 receives the digitized sample from ADC 340. At step 530, the analysis engine 415 averages the signal. At step 540, analysis engine 415 examines the RSSI to determine if the transceiver 200 is moving.

Figure 6:
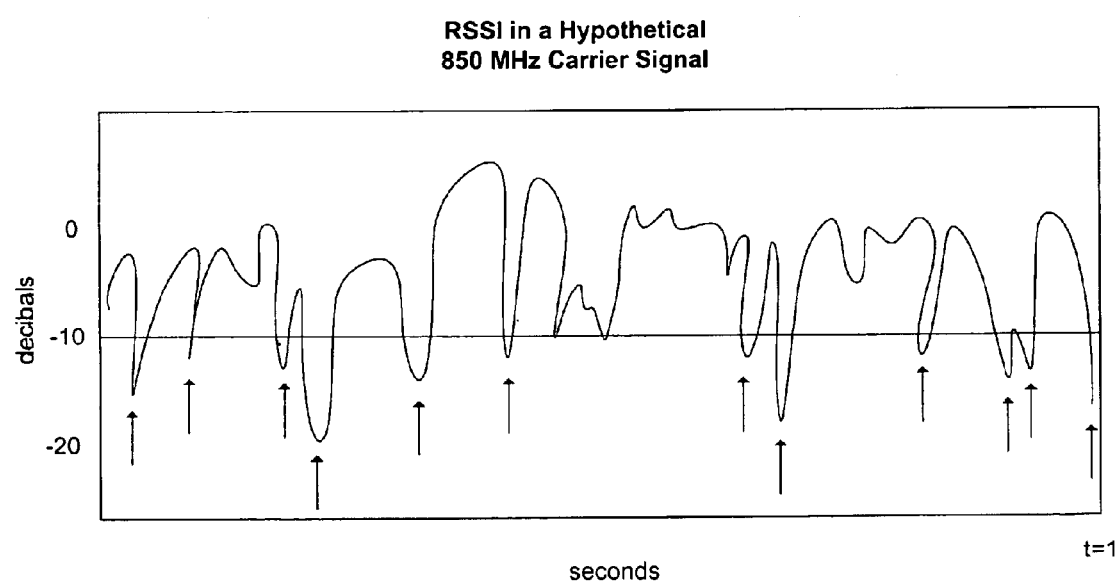
FIG. 6 is a plot of a hypothetical RSSI in decibels below the RSSI's mean.

Analysis engine 415 can determine movement by measuring fade duration or fade frequency of the RSSI as described in The Bell System Technical Journal, January 1979, pages 98–103, which is hereby incorporated by reference. For example, for a one second sample of a 850 Megahertz (MHz) carrier signal as shown in FIG. 6, the number of fades crossing the −10 decibel (dB) level below the mean of the carrier wave per second is approximately numerically equal to the speed of the transceiver 200 in miles per hour ("MPH"). Accordingly, the transceiver in FIG. 6 is estimated at moving at 12 MPH. analysis engine 415 can calculate a more accurate speed measurement by using longer samples or averaging multiple samples. Another method for estimating speed is to measure the fade duration. Generally, fade duration is inversely proportional to speed. For example, at 20 MPH, the average fade duration below −10 dB is 5 milliseconds (ms) for an 850 MHz carrier signal. Analysis engine 415 may also combine fade duration and fade frequency measurements in order to provide a more accurate movement calculation. Alternatively, analysis engine 415 may use other means not described here for determining movement based on RSSI analysis.

If at step 540, analysis engine 415 determines that transceiver 200 is moving, then at step 550, response engine 418 disables FWT 110 by sending a terminate call signal to the base station 120, not accepting input from keypad 230, or other means. In another embodiment, response engine 418 may only disable FWT 110 if transceiver 200 is moving above a minimum speed to allow for movement calculation errors and to allow for a FWT 110 user to move the FWT 110 locally (i.e., within house 100). Further, in another embodiment, program 410 may only disable FWT 110 if transceiver 200 is moving for at least a pre-specified amount of time. Alternatively, response engine 418 may disable FWT 110 only if movement exceeds a pre-specified speed and that movement occurs for at least a pre-specified amount of time.

In addition to or in place of disabling FWT 110 at step 550, response engine 418 may contact FWT's service provider thereby notifying the service provider of the movement. The service provider may then have the option of permanently disconnecting service, charging higher rates when FWT 110 is used as a mobile phone, or imposing fines for using the FWT 110 as a mobile phone in violation of a service provider contract.

If at step 540, analysis engine 415 determines that there is no movement or that movement does not meet a minimum speed or that movement did not occur for at least a minimum amount of time, then at step 560, response engine 418 may determine if the FWT 110 is currently disabled. If the FWT 110 is disabled, then response engine 418 may optionally re-enable FWT 110 at step 570. After step 570 or if at step 560 response engine 418 determined that the FWT 110 was not disabled, program 410 returns to step 520 to receive another RSSI sample.

FIG. 6 is a plot of a hypothetical RSSI from an 850 MHz carrier wave, such as from a FM signal, in decibels below the RSSI's mean. Speed can be determined by measuring fade frequency as speed is directly proportional to fade frequency. For the 850 MHz carrier wave of FIG. 6, the frequency of fade durations/second crossing the −10 dB level is numerically equal the speed of the transceiver 200 in FWT 110. Accordingly, the speed of the transceiver receiving the carrier wave in FIG. 6 is traveling at approximately twelve MPH because there are twelve fades in the one-second sample as indicated by the arrows.

Figure 7:
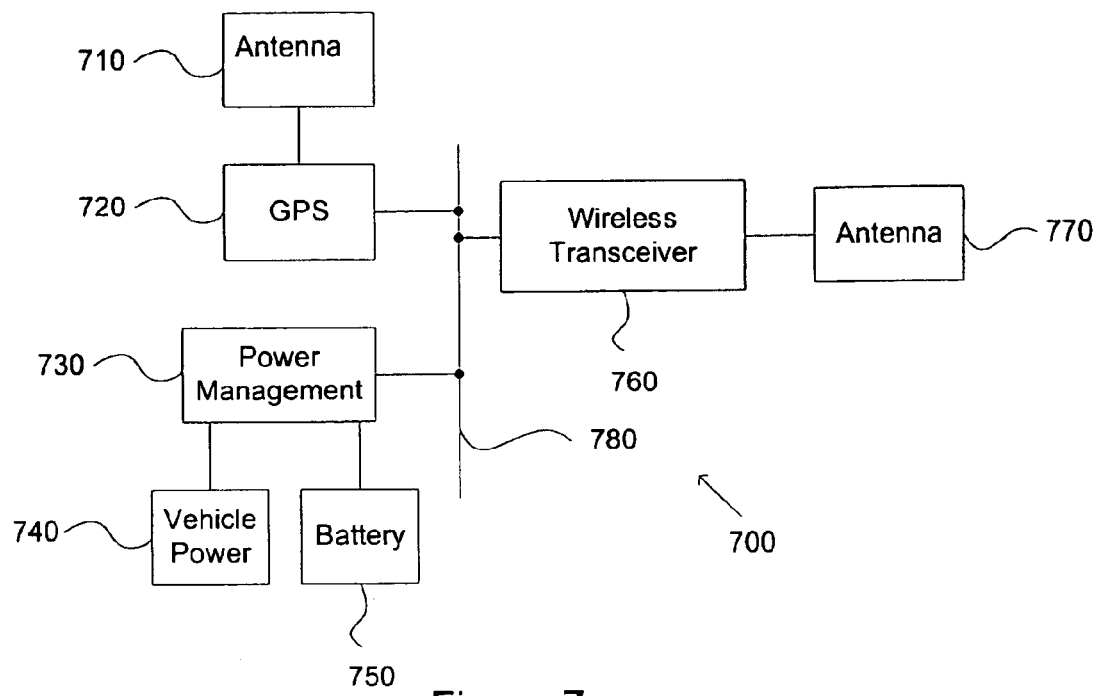
FIG. 7 is a block diagram of an asset tracking device according to a second embodiment of the invention.

FIG. 7 is a block diagram of an asset tracking device 700 according to a second embodiment of the invention. Device 700 is typically coupled to an asset for tracking, such as a freight trailer. Device 700 comprises a global positioning system ("GPS") receiver 720 coupled to GPS antenna 710; a power management unit 730 that receives power from a vehicle 740 and/or via a battery 750; and a wireless transceiver 760 coupled to an antenna 770. GPS receiver 720, wireless transceiver 760 and power management unit 730 communicate to each other via system bus 780. Device 700 may also optionally have a speaker (not shown), microphone (not shown), and keypad (not shown) to enable device 700 as a mobile phone.

Wireless transceiver 760 is identical to wireless transceiver 200 (FIG. 2) except that transceiver 760 includes a modem and contains a different embodiment of program 410 (FIG. 4) in memory. GPS receiver 720 uses GPS satellites to calculate the position of the GPS receiver 720 and then report it to a monitoring station via the modem within transceiver 760. Power management unit 730 supplies power to GPS receiver 720 and transceiver 760. When the asset is coupled to a vehicle 740, power management unit 730 draws power from the vehicle 740 and may charge battery 750. When the asset is not coupled to device 700, power management unit 730 draws power from battery 750. As battery 750 has a finite supply of power, it is important to limit the power draw of GPS receiver 720 when the asset is not moving.

Figure 8:
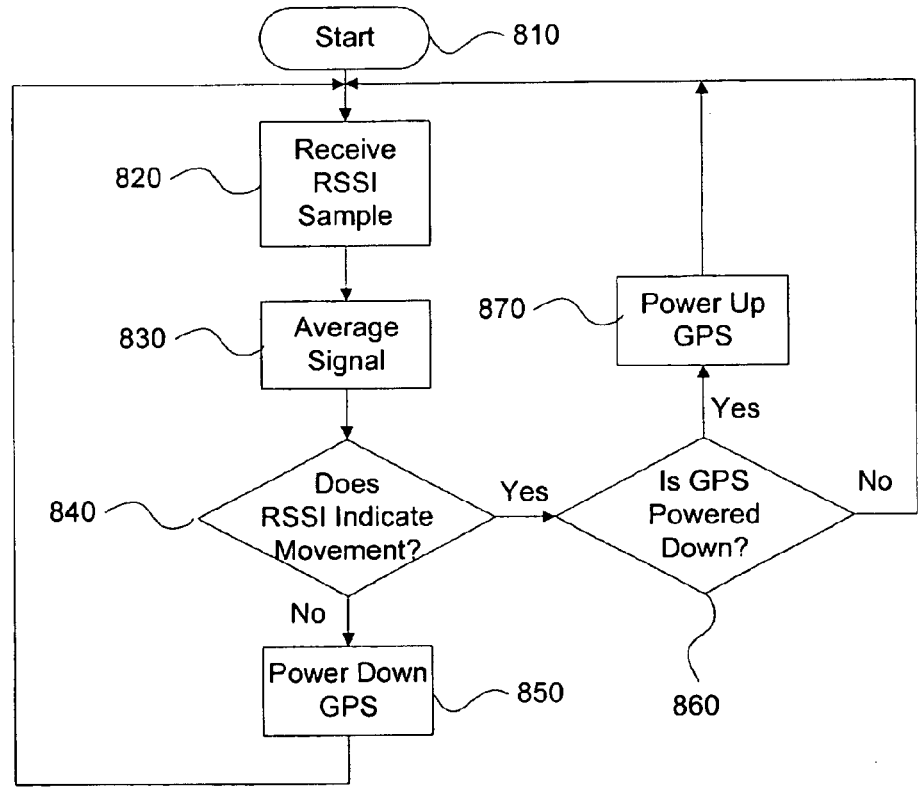
FIG. 8 is a flowchart of method steps performed by a RSSI program according to the second embodiment of the invention.

FIG. 8 is a flowchart 800 of method steps performed by a RSSI program according to the second embodiment of the invention. The second embodiment of the RSSI program conserves power by powering down the GPS receiver 720 when the asset is not moving. Alternatively, the GPS receiver 720 may be placed in a power conservation mode.

At step 820, the RSSI program receives an RSSI sample. At step 830, the program averages the signal. At step 840, the program determines if there is movement or not by examining fade duration, or fade frequency, or both fade duration and fade frequency of the RSSI sample as discussed in conjunction with FIG. 5. If there is no movement, then the program, at step 850, powers down the GPS receiver 720 by sending a power down signal to GPS receiver 720 via system bus 780. Alternatively, the program may place the GPS receiver 720 into a power conservation mode or "sleep" mode, thereby allowing GPS receiver 720 to reactivate quickly when necessary. In an alternative embodiment, the program may not power down GPS receiver 720 unless no movement is detected for a pre-specified amount of time (i.e., no movement for five minutes as compared to no movement for one sample) or if power is being drawn from a vehicle 740.

If at step 840, the program does detect movement, then the program, at step 860, determines if the GPS receiver 720 is currently powered down or in a power conservation mode. If the GPS receiver 720 is powered down or in a power conservation mode, then the program "wakes" the GPS receiver 720 or powers on the GPS receiver 720. The program then returns to step 820 to receive another RSSI sample. If at step 860 the program determines that the GPS is on or "awake," then the program returns to step 820, skipping step 870.

The foregoing description of the preferred embodiments of the present invention is by way of example only, and other variations and modifications of the above-described embodiments and methods are possible in light of the foregoing teaching. For example, while the above-described systems and methods have only been described for FWT and asset tracking embodiments, other embodiments may use the RSSI program to activate or deactivate devices based on detected movement.

Further, for example, baseband processing section 330 can use either analog hardware or digital hardware with software to process signals. The embodiments described herein are not intended to be exhaustive or limiting. The present invention is limited only by the following claims.

What is claimed is:

1. A fixed wireless terminal, comprising:

a wireless transceiver for sending and receiving signals, the wireless transceiver including a processor for detecting movement of the transceiver by examining at least one of RSSI fade duration and fade frequency in the received signal and deactivating the terminal if movement is detected wherein the movement is determined from the at least one of fade duration and fade frequency;

a speaker, coupled to the transceiver, for outputting the received signals as sounds;

a microphone, coupled to the transceiver, for inputting sound to the transceiver; and a keypad, coupled to the transceiver, for entering telephone numbers.

2. The terminal of claim 1, wherein the examining uses fade duration.

3. The terminal of claim 1, wherein the examining uses fade frequency.

4. The terminal of claim 1, wherein the examining uses both fade frequency and fade duration.

5. A tracking device, comprising:

a GPS receiver for calculating position;

a wireless transceiver, coupled to the GPS receiver, for sending and receiving signals, the wireless transceiver including a processor for detecting movement of the transceiver by examining RSSI in a received signal and placing the GPS receiver in a power conservation mode if movement is not detected, wherein the movement is determined from either fade duration or fade frequency of the RSSI.

\* \* \* \* \*